United States Patent [19]

Schlegel

[11] 3,737,124
[45] June 5, 1973

[54] VARIABLE ENERGY ABSORBER FOR AIRCRAFT ARRESTING SYSTEM

[75] Inventor: William R. Schlegel, Colonial Woods, Del.

[73] Assignee: All American Industries, Inc., Wilmington, Del.

[22] Filed: Mar. 16, 1972

[21] Appl. No.: 235,349

[52] U.S. Cl. .............................. 244/110 A, 188/290
[51] Int. Cl. .............................................. B64f 1/02
[58] Field of Search ...................... 244/110; 188/290, 188/292, 293, 296, 279

[56] References Cited

UNITED STATES PATENTS

| | | | |
|---|---|---|---|
| 2,324,074 | 7/1943 | Gerber | 188/290 |
| 3,172,626 | 3/1965 | Haber et al. | 244/110 A |
| 3,259,213 | 7/1966 | Daniels et al. | 244/110 A X |
| 3,599,906 | 8/1971 | Reinemuth | 188/290 X |

*Primary Examiner*—Milton Buchler
*Assistant Examiner*—Paul E. Sauberer
*Attorney*—Arthur G. Connolly, Rudolf E. Hutz and Jacob C. Kellmen et al.

[57] ABSTRACT

The vaned flow reactor elements of an energy absorber for an aircraft arresting system are rotatably mounted coaxially on both sides of the vaned rotor to allow relative slippage in response to the flow reaction between them as the rotor is rotated by the input drive. The input drive is applied through a nylon tape or any other suitable payout element. Brakes within the casing retard the flow reactors and control their slippage to vary the force of the flow reaction between the flow reactors and rotor and thus vary the energy absorbed from the input drive. The more the reactor is retarded, the greater is the reaction force on the rotor and energy absorbed thereby. The brakes within the casing are disposed in heat exchange relation with the fluid to cool them and also to simplify the structure of the device.

10 Claims, 1 Drawing Figure

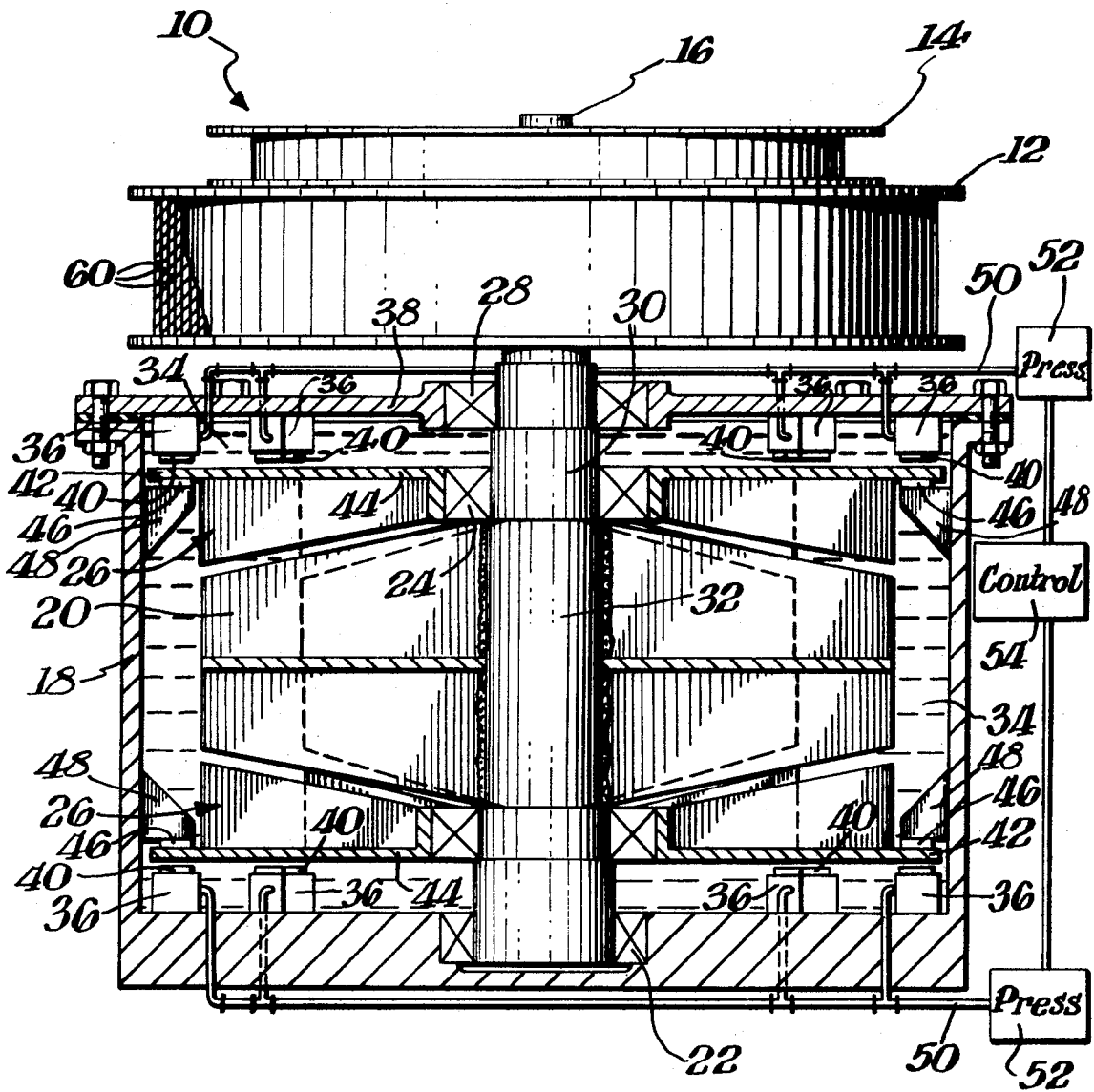

VARIABLE ENERGY ABSORBER FOR AIRCRAFT ARRESTING SYSTEM

BACKGROUND OF THE INVENTION

A highly effective energy absorber for an aircraft arresting system is described in U.S. Pat. No. 3,172,625. It incorporates a rotatable vaned rotor and flow reacting elements or stators immersed in a fluid. The arresting effect of the energy absorber is automatically coarsely programmed, by the diminishing moment arm provided by a taped linear payout element wound on a drum which is secured to the input drive shaft of the rotor, to provide: free runout after initial contact by the aircraft, increasing energy absorption as the moment arm radius and mechanical advantage decrease and final smooth termination as the aircraft and energy absorber slow to rest. This variation in absorption is not, however, as sensitive as might be desired, nor does it enable the energy absorber to operate efficiently in conjunction with a wide variety of aircraft. U.S. Pat. No. 3,172,626 relates to a device of this type in which a friction brake mounted outside of a rotatable casing, to which the stator is attached, is used to vary the rate of energy absorption in accordance with a predetermined program. The external brakes utilized in such a device are, however, difficult to cool and the braking structure is complicated and expensive. An object of this invention is to provide a fluid-operated energy absorber having a readily variable coefficient of energy absorption, which is simple and economical in structure and cool and efficient in operation.

SUMMARY

In accordance with this invention, a flow reactor is rotatably mounted relative to the rotor and brakes are mounted within the casing in variable engagement with the flow reactor to vary the slippage between it and the rotor to vary the amount of energy absorbed from the input drive. The more the reactor is retarded, the greater the reacting force exerted on the rotor and the energy absorbed from the input drive. The brakes within the casing are readily cooled by their heat exchange relationship with the fluid and they are extremely simply and economically mounted on and within the casing. The braking force is controlled either manually or automatically in accordance with a desired program or in accordance with a parameter of operation of the energy absorbing system - such as the amount of linear payout, fluid pressure in the casing or tension in the payout line. A single or a pair of braked flow reactors may be utilized (either equally or unequally actuated), to provide a wide range of variation in coefficient of energy absorption.

BRIEF DESCRIPTION OF THE DRAWING

Novel features and advantages of the present invention will become apparent to one skilled in the art from a reading of the following description in conjunction with the accompanying drawing wherein similar reference characters refer to similar parts and in which the single figure is a view in elevation primarily in cross-section of one embodiment of this invention.

DESCRIPTION OF THE PREFERRED EMBODIMENT

Energy absorber 10 of an aircraft arresting system (otherwise not shown) includes tape storage drum 12 and retrieving capstan drum 14 secured to input drive shaft portion 16 of rotor shaft 32 extending into fluid-filling casing 18. Vaned rotor 20 (substantially similar to that shown in U.S. Pat. No. 3,172,625) is mounted within casing 18 on shaft 32 rotatably mounted in bearings 22 and 28. Vaned fluid reactor elements 26 are rotatably mounted on bearings 28 upon reduced portions 30 of rotor shaft 32 for rotational movement or slippage relative to rotor 20. Casing 18 is filled with a flow reacting fluid 34, such as water containing a suitable antifreeze additive.

An array of spot brakes 36 are mounted on and within removable circular end walls 38 of casing 18 and in heat exchange relationship with fluid 34. Brakes 36 include brake plungers 40 reacting against the outer rims 42 of supporting plates 44 of flow reactors 26. Suitable flat circular spots or pucks 46 of frictional brake material, unaffected by immersion in water are mounted on angular support brackets 48 within casing 18 adjacent rims 42 of flow reactors 26. Brakes 36 are for example of the hydraulic type, connected by hydraulic pressure lines 50 to actuating hydraulic pressure sources 52, which are operated by a suitable control device 54. Pressure sources 52 are equally or unequally actuated to provide a wide variety of coefficients of energy absorption.

OPERATION

Control device 54 is set in accordance with a predetermined program to vary the braking force on flow reacting elements 26 during payout of tape 60 and arrestment of an aircraft. It varies the coefficient of energy absorption or torque to obtain a predetermined or desired energy absorption characteristic throughout the cycle. It is desirable to minimize the fluid torque generated by the energy absorber immediately after impact when the inertia forces of the tape drum and pendant are high. This is accomplished by allowing flow reactor 26 to rotate freely in response to fluid impinging in it from rotor 20. The braking force is then increased after the initial system dynamics are realized and its peak inertia has been imposed on the dynamic system. This rapidly lowers the speed of the aircraft without exerting excessive retarding force on it. This increase in retarding action is accomplished by decreasing the rotation of flow reactor 26 relative to the rotor 20. The greater braking force then applied minimizes or entirely stops rotation of flow reactor elements 26, which then exert maximum force by flow reaction on rotor 20 until rotor 20 and the aircraft are substantially stopped. After completion of the arrestment, a previously disconnected retrieve sprocket (not shown) is actuated to rewind tape 60 on drum 12. Capstan drum 14 can be utilized for rewind. During retrieve or rewind, brakes 36 are fully released from flow reactors 26.

The variable braking force imposed on flow reactor elements 26 also permits the coefficient of torque of energy absorber 10 to be varied in accordance with the mass of the arrested aircraft, such as for light, medium and heavy aircraft. Control device 54 may also operate in response to various parameters of the energy absorbing system including the amount of tape which is paid out at particular time, or the tension of the tape. The pressure within container 18 may also be utilized to control the amount of applied braking force to provide a high degree of energy absorbing efficiency throughout its cycle of operation.

The substantial immersion of brakes 36 and frictional brake material 48 within aqueous fluid 34 effectively cools them within a fluid having excellent heat conducting properties. An external cooler may also be used to help cool fluid 34 before it is recirculated back into casing 18. The installation of brake cylinders 36 on and within removable circular walls 38 greatly simplifies the stable mounting of the brakes with convenient access for maintenance. Control device 54 actuates pressure sources 52 either equally or unequally to provide a wide variety of coefficients of energy absorption for device 10. The energy absorbing torque of device 10 can therefore be precisely controlled in accordance with a desired program or operating parameter.

I claim:

1. A rotary fluid-operated energy absorber for an aircraft arresting system comprising a casing, a fluid in said casing, a rotor, a main bearing rotatably mounting said rotor in said casing, rotary input drive means connected to said rotor, a flow reactor element having fluid-directing elements constructed and arranged for directing a flow of said fluid which reacts against said rotor to absorb energy from said input drive, an auxiliary bearing mounting said flow reactor element to rotate within said casing and relative to said rotor, brake means on and within said casing reacting between said casing and said flow reactor element whereby the slippage between said flow reactor element and said rotor is varied for varying the force of the reaction of the fluid directed from said flow reactor element against said rotor and the energy absorbed by said rotor from said input drive means, and said brake means being disposed in heat exchange relationship with said fluid for cooling them.

2. A rotary fluid-operated energy absorber as set forth in claim 1 wherein said flow reactor element includes an outer rim and said brake means operates against said outer rim.

3. A rotary fluid-operated energy absorber as set forth in claim 2 wherein support brackets are mounted within said casing adjacent said outer rim and opposite said brake means and spots of friction material on said support brackets for frictionally engaging said outer rim between said brake means and said spots of friction material.

4. A rotary fluid-operated energy absorber as set forth in claim 3 wherein said brake means comprises an array of brake cylinders and plungers.

5. A rotary fluid-operated energy absorber as set forth in claim 4 wherein said casing has a removable cover and said brake cylinders and plungers are mounted on and within said removable cover.

6. A rotary fluid-operated energy absorber as set forth in claim 5 wherein said spots of frictional brake material comprise discs of frictional brake material.

7. A rotary fluid-operated energy absorber as set forth in claim 1 wherein a single rotor and at least a single flow reactor element are provided.

8. A rotary fluid-operated energy absorber as set forth in claim 1 wherein said rotor and said flow reactor element are cooperatively vaned.

9. A rotary fluid-operated energy absorber as set forth in claim 1 wherein a control is connected to operate said brake means for controlling the characteristic of the cycle of operation of said energy absorber.

10. A rotary fluid operated energy absorber as set forth in claim 1 having a pair of said flow reactors and said brake means on opposite sides of said rotor.

* * * * *